Jan. 30, 1923.
F. MÜLLER.
METHOD OF MAKING MILLING CUTTERS.
ORIGINAL FILED SEPT. 11, 1919.
1,443,642
2 SHEETS-SHEET 1
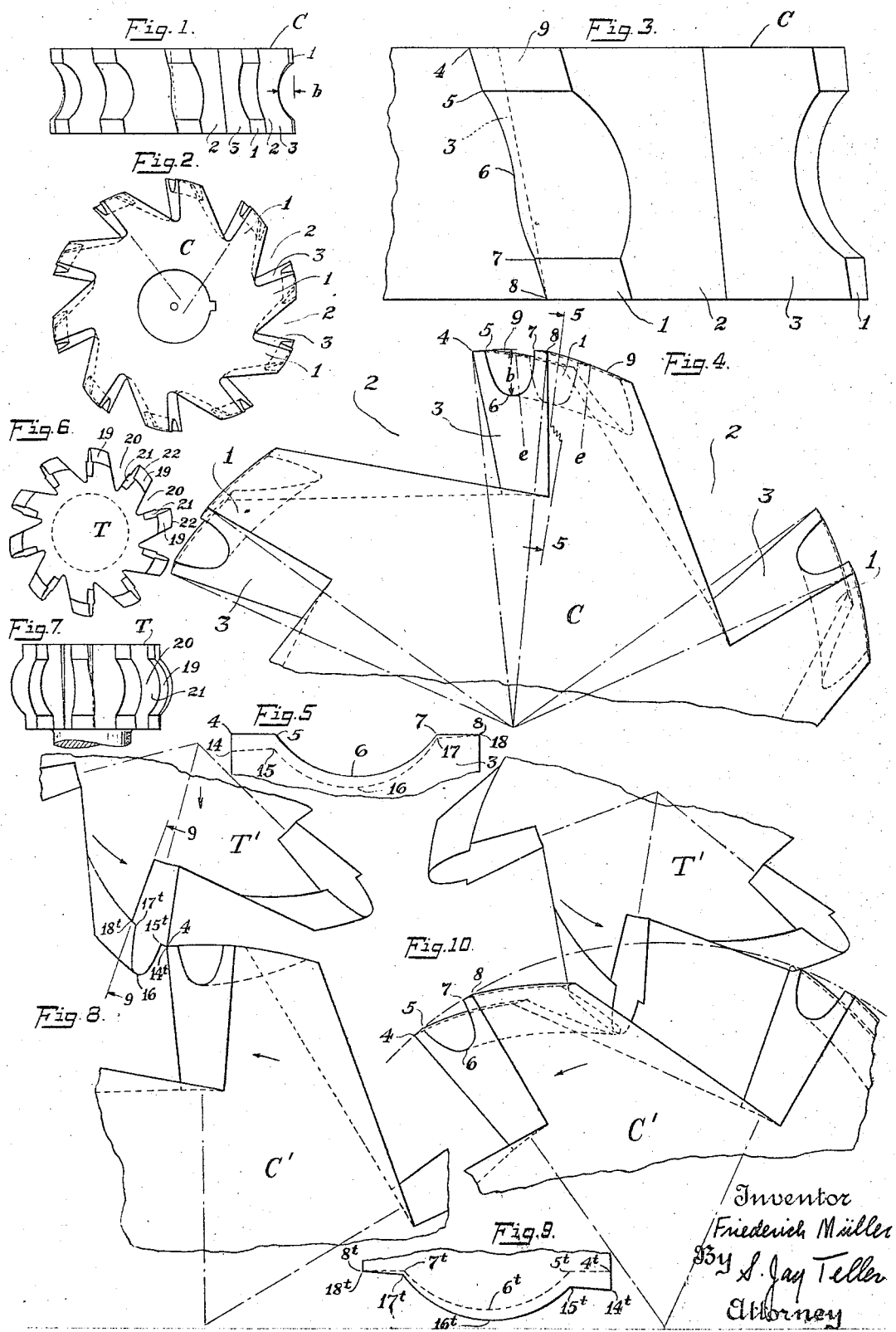
Inventor
Friederich Müller
By S. Jay Teller
Attorney

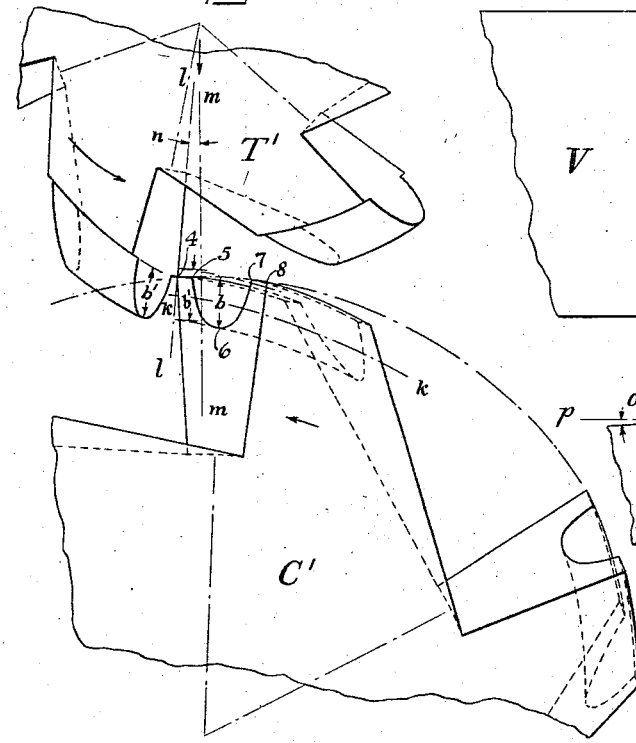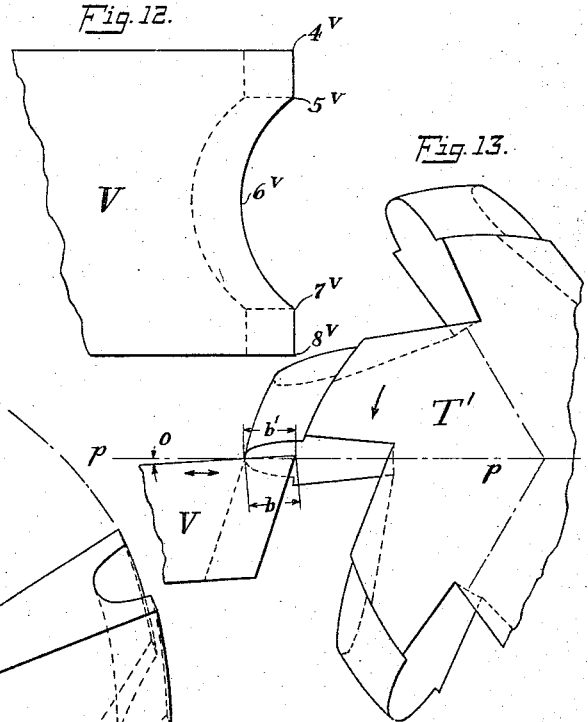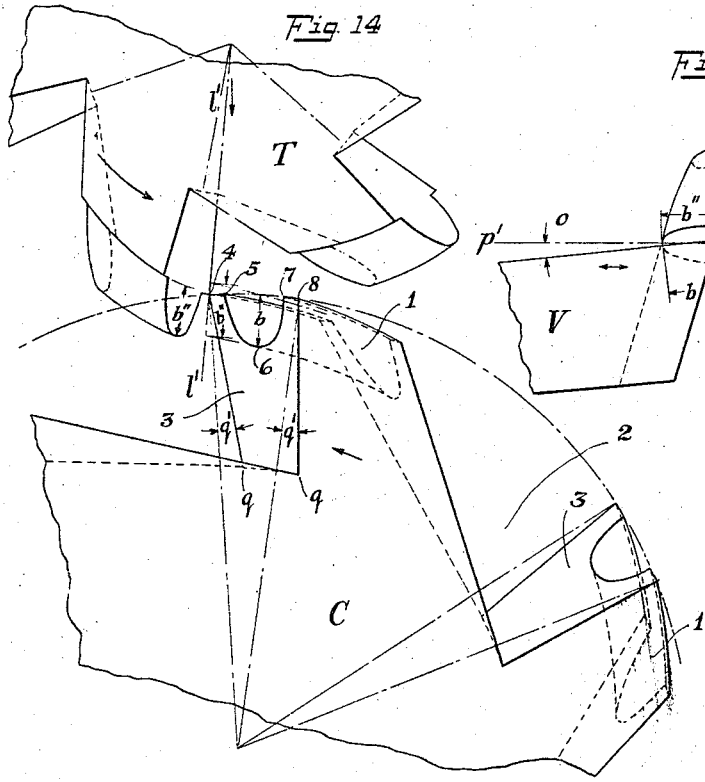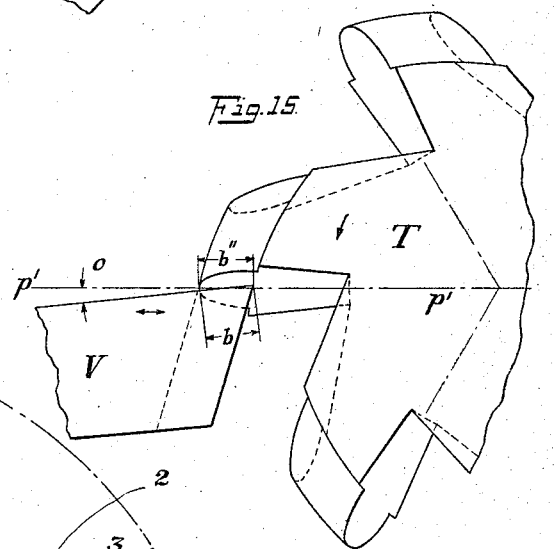

Patented Jan. 30, 1923.

1,443,642

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING CUTTERS.

Application filed September 11, 1919, Serial No. 323,111. Renewed March 24, 1922. Serial No. 546,521.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling Cutters, of which the following is a specification.

In the art of cutting metals it is preferable for many classes of work to incline the face of the cutting tool backward with respect to the direction of relative movement, thus providing a rake or undercut which provides a sharper cutting edge and enables other advantages to be attained. To limited extent this principle has been applied to milling cutters, the cutting face being inclined backward with respect to radial lines; but it has not heretofore been deemed possible to make milling cutters of this type which are adapted to accurately cut a predetermined contour and which are so relieved that they can be ground on the cutting faces without changing the effective contour.

In accordance with the invention presented and claimed in my copending application for milling cutters, Serial No. 323,110 filed on even date herewith I have provided formed or contour cutters which are properly relieved and which have their cutting face non-radial so as to provide a rake or undercut. The cutting faces of a cutter embodying the invention set forth in the said application may be parallel with the axis or they may be inclined or helicoidal as set forth in my patent for milling cutters, No. 1,348,295, dated August 3, 1920.

The object of the present invention is to provide a method of making milling cutters of the type referred to. The cutters may have their cutting faces parallel with the axis or inclined as desired. When the cutting faces are inclined or helicoidal as is preferred, the present method includes the method set forth in my patent for methods of making milling cutters, No. 1,348,296, dated August 3rd, 1920.

In order that the method may be clearly understood, I have shown in the accompanying drawings a cutter embodying the invention set forth in the aforesaid application Serial No. 323,110, and I have illustrated one way in which the method may be practiced. It will be understood, however, that the drawings are for illustrative purposes only and are not to be construed as defining or limiting the scope of the invention, the accompanying claims being relied upon for that purpose. It will be particularly understood that the contour of the cutter shown has been selected merely by way of example and that any practical contour may be substituted for that illustrated.

Of the drawings:

Figs. 1 and 2 are side and end views respectively of a cutter such as may be made in accordance with the invention.

Figs. 3 and 4 are enlarged fragmentary diagrammatic plan and end views respectively of the milling cutter shown in Figs. 1 and 2. In these views there is shown a smaller number of teeth and the inclination of the cutting faces and the relief are increased in order to bring out the principles of the invention more clearly.

Fig. 5 is a diagrammatic view illustrating certain features of the cutter shown in Figs. 3 and 4.

Figs. 6 and 7 are end and bottom views respectively of a preliminary milling cutter which may be used for milling the final cutter shown in Figs. 1 and 2.

Fig. 8 is a diagrammatic view on the same scale as Figs. 3 and 4 illustrating a slightly different preliminary cutter diagrammatically and showing it in use for milling a blank for a final cutter, the milling operation having been started but not finished. For the sake of simplicity the blank for the final cutter is shown with radial cutting faces instead of non-radial cutting faces.

Fig. 9 is a diagrammatic view on the same scale as Fig. 8 illustrating certain features of the preliminary cutter.

Fig. 10 is a view similar to Fig. 8 but illustrating the blank completely milled.

Fig. 11 is a view similar to Fig. 8 but showing the preliminary cutter in operative relation to a finished final cutter.

Fig. 12 is a plan view of a lathe tool adapted to be used for shaping the preliminary milling cutter.

Fig. 13 is a diagrammatic view illustrating a method of shaping the preliminary milling cutter, use being made of the lathe tool shown in Fig. 12.

Fig. 14 is a view similar to Fig. 11 but illustrating a final cutter having non-radial or undercut cutting faces and illustrating the preliminary cutter shown in Figs. 6 and 7.

Fig. 15 is a view similar to Fig. 13 and illustrating a method of shaping the preliminary milling cutter shown in Fig. 14.

In order that the method may be clearly understood I will first describe a cutter such as can be made in accordance with the invention. Referring particularly to Figs. 1 to 5 of the drawings, it will be seen that I have shown a cutter C which is shaped to cut a predetermined contour differing from a straight line. The cutter is provided with a plurality of generally longitudinal teeth 1 between which are grooves 2, the teeth and grooves being preferably spaced uniformly. The grooves 2 between the teeth can be of any usual or preferred depth and shape, as required by the spacing and by the depth of the contour to be cut. The front wall 3 of each tooth 1 constitutes the cutting face thereof and this cutting face is non-radial, being inclined backward in order to provide an improved cutting angle. Each cutting face 3 is inclined or positioned obliquely so that its longitudinal lines lie at angles to the axis of the cutter. Preferably, each tooth 1 is generally helical in form and each cutting face 3 conforms to a helicoid. As illustrated, the helicoid is one formed by a generatrix following a helix on a small cylinder concentric with the axis and also following a helix on a much larger cylinder also concentric with the axis. The teeth and the cutting faces may be inclined in either direction with respect to the axis and the degree of inclination may be varied as required.

The cutter may be made for cutting any desired practical contour. The contour may be made up of a series of straight lines, or a series of circular arcs, or a combination of circular arcs and straight lines, or the contour may consist in whole or in part of non-circular curves. The cutter C shown is adapted for cutting a contour consisting of straight end portions and a convex central portion conforming to a circular arc and having a depth $b$. It will be understood that this particular contour has been selected merely by way of example and that the contour can vary in any practical way that may be desired, the method being particularly applicable however for making a cutter having a curved contour.

The outer edge of each cutting face 3 has an outline which is adapted to cut the predetermined contour when the cutter is rotated, this outline of the cutting face following the helicoidal surface thereof. This will be more clearly understood from the diagrammatic views in Figs. 3 and 4. For the particular contour illustrated, the four points, 4, 5, 7 and 8 on the outline of the cutting face are all at equal distances from the axis of the cutter; the central point 6 is at a distance from the axis which is less by the distance $b$; and all other points along the outline are at their respective correct distances from the center so that when the cutter is rotated they will define the correct predetermined contour, as shown by full lines in Fig. 5. This relationship of the several points along the outline of the cutting face obtains notwithstanding the fact that the cutting face is a non-radial warped or helicoidal surface.

Each tooth of the cutter is relieved along lines 9 extending backward and inward from the outline of the non-radial cutting face, these relief lines forming a continuous surface or continuous surfaces which extend from end to end of the cutter. The relief lines are properly constructed notwithstanding the variations in radius at different points along the said outline and notwithstanding the variations in angular position resulting from the non-radial warped or helicoidal cutting face. Preferably the relief lines 9 are maintained in similar relationship to each other as they extend backward and inward, the lines conforming to spirals of Archimedes. The result is that each tooth of the cutter, at any axial plane of intersection, such as 5—5, has a distorted shape, as shown by dotted lines in Fig. 5. This distorted shape includes points 14, 15, 16, 17 and 18 corresponding respectively to the points 4, 5, 6, 7 and 8 on the outline of the cutting face. The distortion of shape results from the fact that the successive inward inclined relief lines 9 start at different angular positions because of the non-radial helicoidal cutting face. Therefore with the cutting face inclined in the direction illustrated the several points 17, 16, 15 and 14 to the left of the point 8 or 18 are spaced inward from the respective points 7, 6, 5 and 4 by progressively increasing distances. Notwithstanding this distortion in shape at an axial plane of intersection, the outline or effective contour at the cutting face is correct, as before stated.

When the relief lines 9 conform to spirals and are maintained in similar relationship as they extend backward and inward, as is preferred, it is possible to sharpen or grind the teeth of the cutter on the front cutting faces 3 without changing the effective contour. The teeth present the same effective contour at successive non-radial helicoidal surfaces of intersection similar in form and position to the initial cutting faces 3. At any surface, such as $e$—$e$, back of an initial cutting face 3 and similar to the said face, the same effective contour will be found. Therefore if the teeth are ground on their front faces to non-radial helicoids which are the same as the non-radial helicoids of the initial cutting faces the effective contour will remain the same.

Taking up now the method of making the milling cutter, it will be understood that the preliminary steps of turning the blank, cutting the grooves therein, etc., can be carried on in any usual or preferred way, these not of themselves constituting any part of the present invention. The invention relates particularly to the method of shaping the blank to provide a distorted shape which will enable it to cut a correct contour.

In accordance with the general method set forth in my aforesaid Patent No. 1,348,296 the shape of the cutter to be made is formed by means of a preliminary milling cutter, this preliminary cutter preferably acting directly on the final cutter. Figs. 6 and 7 show a preliminary milling cutter T such as may be used. The cutter T is formed with teeth 19 having grooves 20 between them. As set forth in the said application, each tooth 19 of the preliminary cutter is formed with a helicoidal cutting face 21 having a longitudinal pitch bearing a predetermined ratio to the longitudinal pitch of the helicoids of the final cutter C; and each tooth is provided with relief lines 22 having a degree of relief bearing the same predetermined ratio to the degree of relief of the teeth of the final cutter.

Referring to the diagrammatic Fig. 8, which shows a cutter T' very similar to the cutter T, it will be seen that each tooth of the cutter has at any longitudinal plane of intersection such as 9—9 a shape which is the same or approximately the same as the predetermined contour to be cut by the final cutter. This is indicated by dotted lines in Fig. 9, the points $4^t$, $5^t$, $6^t$, $7^t$ and $8^t$ corresponding respectively to the points 4, 5, 6, 7 and 8 on the effective contour of the final cutter.

As the result of providing the preliminary cutter T' with helicoidal cutting faces and with the relief as shown and described, the contour of each cutting face is distorted, the extent of distortion being the same in amount as that of the final cutter at an axial plane of intersection as shown by dotted lines in Fig. 5. As shown by full lines in Fig. 9 the distorted contour of the cutter T' has points $14^t$, $15^t$, $16^t$, $17^t$ and $18^t$ corresponding respectively to the points $4^t$, $5^t$, $6^t$, $7^t$ and $8^t$. The several points $15^t$, $16^t$, $17^t$ and $18^t$ to the right of the point $4^t$ or $14^t$ are spaced outward from the respective points $5^t$, $6^t$, $7^t$ and $8^t$ by progressively increasing distances.

In Figs. 8 and 10 I have shown the cutter T' used for shaping a blank to form a cutter C' having radial cutting faces. It will be understood that the cutter T' is rapidly rotating in the direction indicated by the arrow thereon; that the blank is slowly rotating in the direction indicated by the arrow thereon; and that relative approaching and receding movements are effected between the cutter and the blank in timed relation to the blank rotation to provide the required relief on the final cutter. The relieving movements are preferably effected by moving the axis of the cutter bodily toward the axis of the blank, as indicated by the vertical arrow, and then bodily away from the axis of the blank in the opposite direction. Preferably the downward or inward relieving movement is so timed that the resulting relief on the blank will conform to spirals of Archimedes. The cutter T' is moved slowly downward during the cutting of each tooth and then is rapidly moved upward between the teeth to position it for the cutting of the next tooth.

As shown in Fig. 8, the cutter T' and the blank have been so adjusted that the teeth of the rotating cutter will mill the initial point 4 of the tooth of the blank C' to the required distance from the axis. The downward movement of the cutter T' in timed relation to the slow rotation of the blank causes it to take a cut which gradually increases in depth at the successive points back of the point 4. As the cutter blank C' is slowly turned and as the cutter T' is fed downward in accordance with the relief, the parts move to the position shown in Fig. 10, the distorted shape of the cutter T' exactly compensating for the distortion which would otherwise take place in the shape of the cutter C'. The cutter T' shapes the cutter C' with the several points 4, 5, 6, 7 and 8 all at the proper distances from the axis, so that the cutter C' when used will generate the true contour, as shown by full lines in Fig. 5.

Referring to Fig. 11, it will be noted that the dot-and-dash line $k$—$k$ represents in a general way the direction of relative movement of the preliminary milling cutter in forming the relieved outline of the tooth on the cutter C'. As the preliminary cutter T' is rapidly rotating its plane of maximum depth of cutting will necessarily be perpendicular to the line $k$—$k$. Cutting to the maximum depth of contour will therefore be effected at a plane such as $l$—$l$ perpendicular to the line $k$—$k$. The transverse shape of the tooth of the cutter C' will therefore be determined as the successive parts of the teeth pass the plane $l$—$l$. But when the cutter C' is afterward used in a milling operation it will cut to its maximum depth and determine the contour of the body being cut at a plane such as $m$—$m$ passing through the axis. Clearly the planes $l$—$l$ and $m$—$m$ are not and cannot be parallel, there being an angle such as $h$ included between them. The depth distance $b$ of the final cutter measured along the plane m—m is slightly greater than the depth distance b′ of the preliminary cutter measured along the plane l—l, the amount of the difference being dependent on the angle of relief. Therefore, if the preliminary cutter has exactly the predetermined shape at axial longitudinal planes of intersection, a slight error in the shape of the final cutter results from the fact that the shape is formed at the plane l—l and used at the plane m—m. This error is very slight and for many classes of work can be treated as entirely negligible. However, for work requiring the very highest degree of accuracy it may be desirable to correct this error.

Fig. 12 shows a lathe tool V having a contour 4ᵛ, 5ᵛ, 6ᵛ, 7ᵛ, 8ᵛ, which is exactly the same as the predetermined contour 4, 5, 6, 7, 8, which is to be finally cut by the cutter. This tool is used in a relieving lathe to shape the preliminary cutter T′ as illustrated in Fig. 13. The tool V is set with its cutting face in a non-axial plane, an angle such as o being included between the cutting face of the tool and a plane such as p—p through the axis of the cutter. When the preliminary cutter is being formed it is rotated in the direction of the arrow, the tool V being moved in and out as indicated by the horizontal arrow so as to follow the proper relief lines.

As before stated the depth b of the contour measured along the plane m—m will be slightly greater than the depth b′ measured along the plane l—l. In order to make the depth b correct at the plane m—m, the depth b′ at the plane l—l must be slightly decreased. Therefore the contour of the preliminary cutter is slightly changed by decreasing the radial dimensions to an extent dependent on the angle of relief of the final cutter. In Fig. 13 the plane p—p corresponds in a general way to the plane l—l, and by setting the tool at an angle, as indicated, the depth b′ of the contour at the plane p—p is made slightly less than the full depth b measured along the top plane of the tool V. From the foregoing description it will be seen that, by the method illustrated, the depth of the contour of the final cutter C′ at the plane m—m is properly corrected.

The cutter C with non-radial or undercut cutting faces is fragmentarily illustrated in Fig. 14 in conjunction with the preliminary cutter T. It will be seen that the front faces of the teeth are so formed that planes perpendicular to the axis of the cutter will intersect, not along radial lines, but along lines such as q—q each at an angle such as q′ to the corresponding radius. If it be assumed that the external helix of generation is the same for the cutter C as for the cutter C′ the outermost points 4, 5, 7, and 8 will not be changed from the positions occupied by the corresponding points 4, 5, 7 and 8 of the cutter C′, as shown in Fig. 10. All other points, however, such as the point 6, spaced inward from the periphery will be located further back along the relief lines and would therefore be nearer the axis of the cutter if the cutter were to be milled by a cutter T′, in the way shown in Figs. 8 and 10. To avoid this error the depth b″, measured along the plane l′—l′ perpendicularly to the relief, is decreased to an extent dependent upon the non-radial angle of the cutting faces. This decrease is in addition to that already described as necessary to compensate for the angle of relief.

In order that the preliminary cutter T may have the proper depth and other radial dimensions to compensate not only for the undercut faces but also for the relief, it is formed by the method illustrated in Fig. 15. Use is made of a lathe tool V which may be the same as that already shown in Figs. 12 and 13. This tool is set with its cutting face in a non-radial plane, an angle such as o′ being included between the cutting face of the tool and a plane such as p′—p′ through the axis of the cutter. The angle o′ is somewhat greater than the angle o shown in Fig. 13. Inasmuch as the contour has the correct depth b measured along the top face of the tool it will have a slightly shorter depth b″ measured along the plane p′—p′. When the cutter T is used to mill the cutter C as shown in Fig. 14 it will cut a contour which is of decreased depth b″ measured along the plane l′—l′ but which has the correct depth b when measured radially.

What I claim is:

1. The herein described method of shaping a spirally relieved milling cutter adapted to cut a predetermined contour other than a straight line and having non-radial helicoidal cutting faces, the method consisting in forming a preliminary milling cutter having at axial planes of intersection a shape approximately the same as the predetermined contour but with the radial dimensions slightly decreased to an extent dependent on the non-radial angle of the cutting faces of the final cutter, the said preliminary cutter having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, and in forming the shape of the relieved final milling cutter from the said preliminary milling cutter whereby the final cutter is formed with a distorted shape at axial planes of intersection but is adapted to cut the correct contour when rotated.

2. The herein described method of shaping a spirally relieved milling cutter adapted to cut a predetermined contour other than a straight line and having non-radial helicoidal cutting faces, the method consisting in forming a preliminary milling cutter having at axial planes of intersection a shape approximately the same as the predetermined contour but with the radial dimensions slightly decreased to an extent dependent on the angle of relief of the final cutter and further decreased to an extent dependent on the non-radial angle of the cutting faces of the final cutter, the said preliminary cutter provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, and in forming the shape of the relieved final milling cutter from the said preliminary milling cutter whereby the final cutter is formed with a distorted shape at axial planes of intersection but is adapted to cut the correct contour when rotated.

3. The herein described method of shaping a spirally relieved milling cutter adapted to cut a predetermined contour other than a straight line and having non-radial helicoidal cutting faces, the method consisting in providing an initial lathe tool having exactly the predetermined contour, in providing a preliminary milling cutter having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, in utilizing the lathe tool to cut the shape of the preliminary cutter, the tool being set with its cutting face at an angle to a radius of the preliminary cutter whereby the said cutter is formed at axial planes of intersection with a shape approximately the same as the predetermined contour but with the radial dimensions slightly decreased to an extent dependent on the non-radial angle of the cutting faces of the final cutter, and in forming the shape of the relieved final milling cutter from the said preliminary milling cutter whereby the final cutter is formed with a distorted shape at axial planes of intersection but is adapted to cut the correct contour when rotated.

4. The herein described method of shaping a spirally relieved milling cutter adapted to cut a predetermined contour other than a straight line and having non-radial helicoidal cutting faces, the method consisting in providing an initial lathe tool having exactly the predetermined contour, in providing a preliminary milling cutter having its teeth provided with helicoidal cutting faces with a longitudinal pitch bearing a predetermined ratio to the longitudinal pitch of the helicoidal cutting faces of the final cutter and provided with a degree of spiral relief bearing the same predetermined ratio to the degree of spiral relief of the teeth of the final cutter, in utilizing the lathe tool to cut the shape of the preliminary cutter, the tool being set with its cutting face at an angle to a radius of the preliminary cutter whereby the said cutter is formed at axial planes of intersection with a shape approximately the same as the pretermined contour but with the radial dimensions slightly decreased to an extent dependent on the angle of relief of the final cutter and further decreased to an extent dependent on the non-radial angle of the cutting faces of the final cutter, and in forming the shape of the relieved final milling cutter from the said preliminary milling cutter whereby the final cutter is formed with a distorted shape at axial planes of intersection but is adapted to cut the correct contour when rotated.

In testimony whereof, I hereto affix my signature.

FRIEDERICH MÜLLER.